US008842301B2

(12) United States Patent
Hirako et al.

(10) Patent No.: US 8,842,301 B2

(45) Date of Patent: Sep. 23, 2014

(54) SUPPLY CONTROL DEVICE, IMAGE-FORMING DEVICE, SUPPLY CONTROL METHOD, AND COMPUTER READABLE MEDIUM

(75) Inventors: Naoki Hirako, Ebina (JP); Hideo Kimura, Ebina (JP); Keita Kumokiri, Ebina (JP); Shun Kuwahara, Ebina (JP); Hiroyuki Funayama, Ebina (JP); Izumi Suda, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1332 days.

(21) Appl. No.: 12/612,369

(22) Filed: Nov. 4, 2009

(65) Prior Publication Data

US 2010/0328709 A1 Dec. 30, 2010

(30) Foreign Application Priority Data

Jun. 26, 2009 (JP) ................................ 2009-152111

(51) Int. Cl.
*G06F 15/00* (2006.01)
*G03G 15/00* (2006.01)

(52) U.S. Cl.
CPC .......... *G03G 15/553* (2013.01); *G03G 15/6508* (2013.01)
USPC ........................................ 358/1.13; 358/1.15

(58) Field of Classification Search
CPC ............ G03G 15/553; G03G 15/6508; G03G 2215/00725; G03G 2215/00729; G03G 2215/00067; H04N 1/00633; H04N 1/00954; H04N 1/2353; H04N 1/2369; H04N 1/2392; G06F 3/1296; G06L 15/465; G06L 15/16; B41J 13/106
USPC .................................................. 358/1.1, 1.15
See application file for complete search history.

(56) References Cited

U.S. PATENT DOCUMENTS

2007/0183796 A1* 8/2007 Ueki et al. ...................... 399/23

FOREIGN PATENT DOCUMENTS

| | | | |
|---|---|---|---|
| JP | 04347672 | A | 2/1992 |
| JP | 04-256637 | A | 9/1992 |
| JP | 08-188280 | A | 7/1996 |
| JP | 2003312871 | A | 6/2003 |
| JP | 2005239386 | A | 8/2005 |
| JP | 2007217166 | A | 8/2007 |

OTHER PUBLICATIONS

Office Action issued by Japanese Patent Office in corresponding Japanese Application No. 2009-152111, dated Apr. 17, 2013.

* cited by examiner

*Primary Examiner* — King Poon
*Assistant Examiner* — Iriana Cruz
(74) *Attorney, Agent, or Firm* — Sughrue Mion, PLLC

(57) ABSTRACT

A supply control device includes: a deciding unit that decides an order of plural containers that supply recording media to an image-forming unit that forms an image on a recording medium; a specifying unit that specifies one of the plural containers; a determining unit that determines for each of the plural containers whether recording media stored in the container are available for forming an image, in the order decided by the deciding unit, in which the container specified by the specifying unit is set as a starting point; and a supply unit that retrieves a recording medium from a container whose recording media have been determined by the determining unit to be available for forming an image, and supplies the recording medium to the image-forming unit.

7 Claims, 11 Drawing Sheets

1133

| USE ORDER | CONTAINER ID |
|---|---|
| 1 | tr1 |
| 2 | tr3 |
| 3 | tr6 |

1133

| USE ORDER | CONTAINER ID |
|---|---|
| 1 | tr1 |
| 2 | tr2 |
| 3 | tr3 |
| 4 | tr4 |
| 5 | tr5 |

1131

| REGISTRY NO. | CONTAINER ID | RECORDING MEDIUM SUPPLY DEVICE ID | RECORDING MEDIUM SIZE | RECORDING MEDIUM SUPPLY DIRECTION | AVAILABILITY |
|---|---|---|---|---|---|
| 1 | tr1 | 2a | A4 | LONGITUDINAL | AVAILABLE |
| 2 | tr2 | 2a | B5 | LATERAL | AVAILABLE |
| 3 | tr3 | 2b | A4 | LATERAL | AVAILABLE |
| 4 | tr4 | 2b | A4 | LONGITUDINAL | NOT AVAILABLE |
| 5 | tr5 | 2c | A3 | LONGITUDINAL | AVAILABLE |
| 6 | tr6 | 2c | A4 | LONGITUDINAL | AVAILABLE |
| 7 | tr7 | 2c | B4 | LATERAL | NOT AVAILABLE |

SUPPLY CONTROL DEVICE, IMAGE-FORMING DEVICE, SUPPLY CONTROL METHOD, AND COMPUTER READABLE MEDIUM

CROSS-REFERENCE TO RELATED APPLICATIONS

This application is based on and claims priority under 35 USC 119 from Japanese Patent Application No. 2009-152111 filed on Jun. 26, 2009.

BACKGROUND

1. Technical Field

The present invention relates to a supply control device, an image-forming device, a supply control method, and computer readable medium.

2. Related Art

Some image-forming devices have plural containers of recording media such as a sheet tray or a sheet case for printing of a large number of documents. Also, some image-forming devices print large numbers of documents in cooperation with a recording medium supply device having plural containers of recording media. Such an image-forming device forms an image on a recording medium supplied from one of plural containers. If a supply of recording media stored in a container has run out, a source of recording media to an image-forming engine is changed to another container. Accordingly, an image-forming device is able to continue an operation of forming an image.

SUMMARY

An aspect of the prevent invention provides a supply control device including: a deciding unit that decides an order of plural containers that supply recording media to an image-forming unit that forms an image on a recording medium; a specifying unit that specifies one of the plural containers; a determining unit that determines for each of the plural containers whether recording media stored in the container are available for forming an image, in the order decided by the deciding unit, in which the container specified by the specifying unit is set as a starting point; and a supply unit that retrieves a recording medium from a container whose recording media have been determined by the determining unit to be available for forming an image, and supplies the recording medium to the image-forming unit, wherein if the supply unit terminates providing recording media from the container whose recording media have been determined by the determining unit to be available for forming an image, the specifying unit specifies a container subsequent to the used container in the order.

BRIEF DESCRIPTION OF THE DRAWINGS

Exemplary embodiments of the present invention will be described in detail below with reference to the following figures, wherein.

DETAILED DESCRIPTION

Exemplary embodiments of the present invention will be described below.

In the following exemplary embodiments, an electro-photographic printer (image-forming device) including an intermediate transfer belt and a so-called tandem engine will be described as an exemplary embodiment of the present invention; however, the present invention may be realized as one of several other devices.

1. First Exemplary Embodiment

1-1. Configuration of First Exemplary Embodiment

1-1-1. Configuration of Entire Image-Forming System

Figure 1:
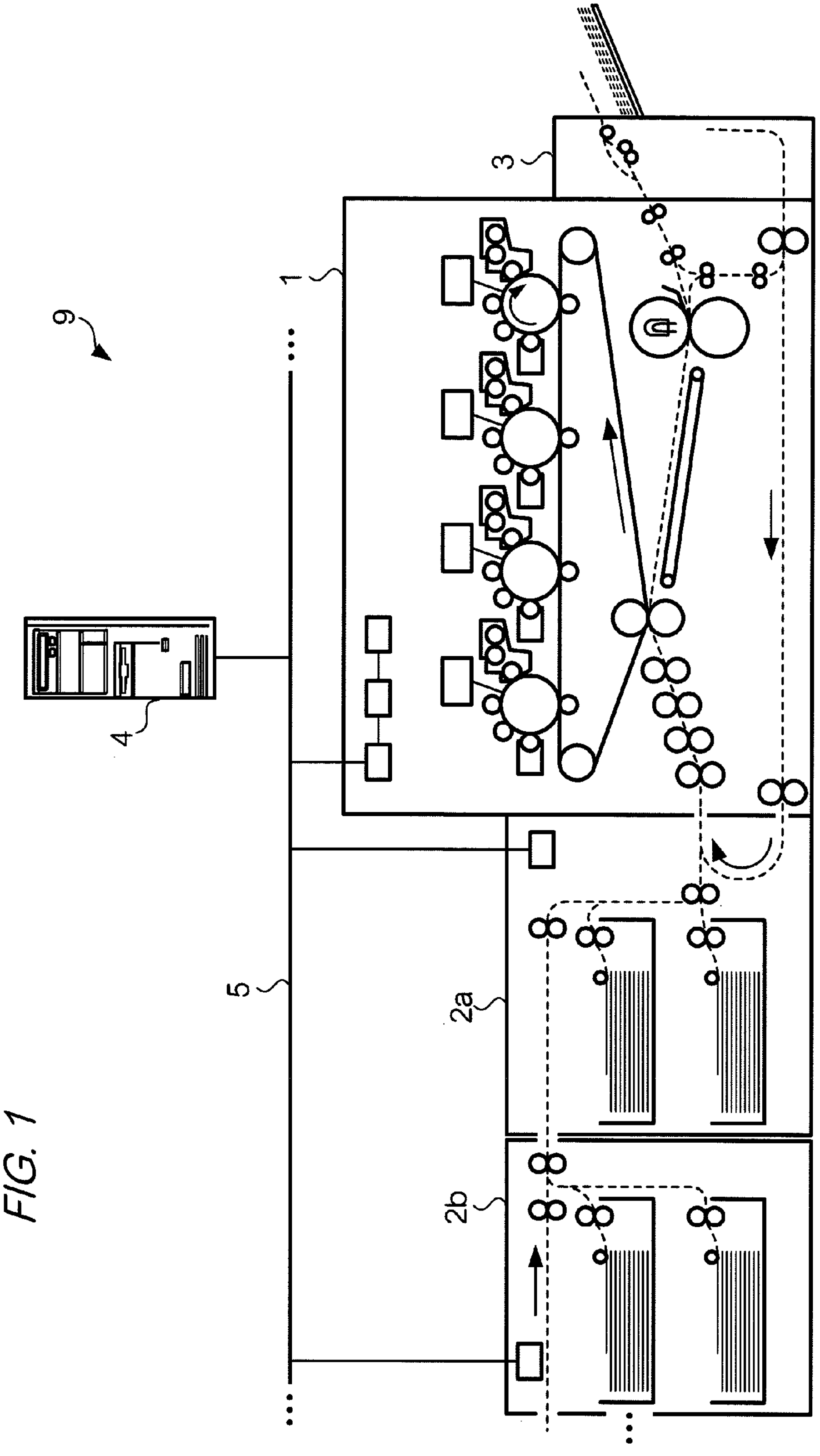
FIG. 1 is a diagram showing a configuration of an entire image-forming system according to an exemplary embodiment.

FIG. 1 is a diagram showing a configuration of entire image-forming system 9 according to the present exemplary embodiment. As shown in the drawing, image-forming system 9 includes image-forming device 1, plural recording medium supply devices 2*a*, 2*b*, . . . (hereinafter collectively referred to as "recording medium supply device 2," except where it is necessary to specify otherwise), finisher 3, and host computer 4. The devices are connected with each other via network 5.

Image-forming device 1 forms an image on a recording medium such as a sheet. Forming of an image may be carried out using a known electro-photographic technology or an alternative technology.

Recording medium supply devices 2 supply recording media to image-forming device 1. Recording medium supply devices 2 include plural containers to accommodate recording media of different sizes or qualities of material. Recording medium supply devices 2 are configured to retrieve a recording medium from one of plural containers and supply it to image-forming device 1.

Finisher 3 ejects a recording medium on which an image has been formed by image-forming device 1. Also, finisher 3 carries out a finishing process such as cutting or stapling, on a stack of recording media ejected from image-forming device 1 after image forming.

1-1-2. Configuration of Image-Forming Device

Figure 2:
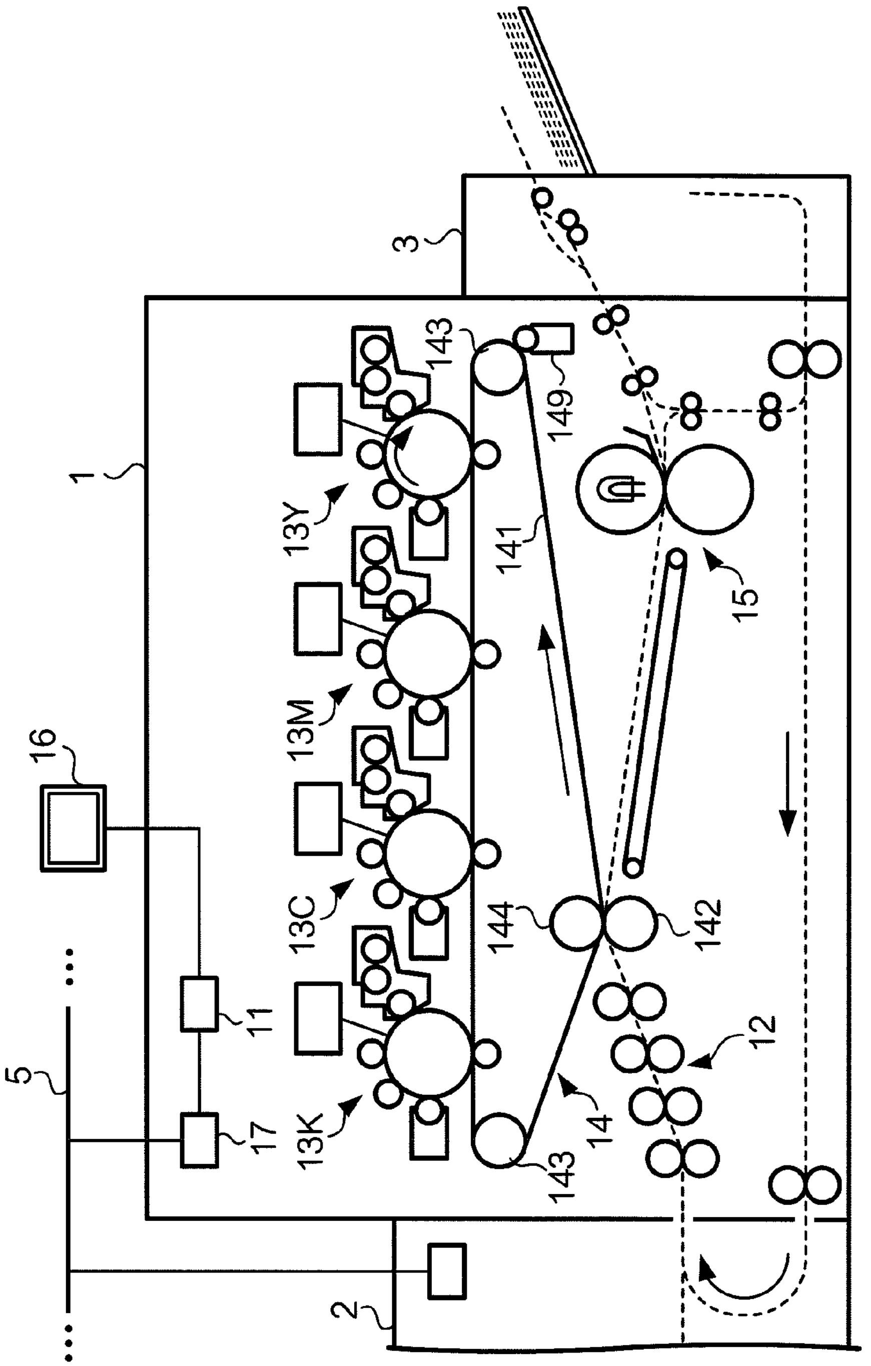
FIG. 2 is a schematic view of a structure of an image-forming device.
Figures 3, 5A, 5B:
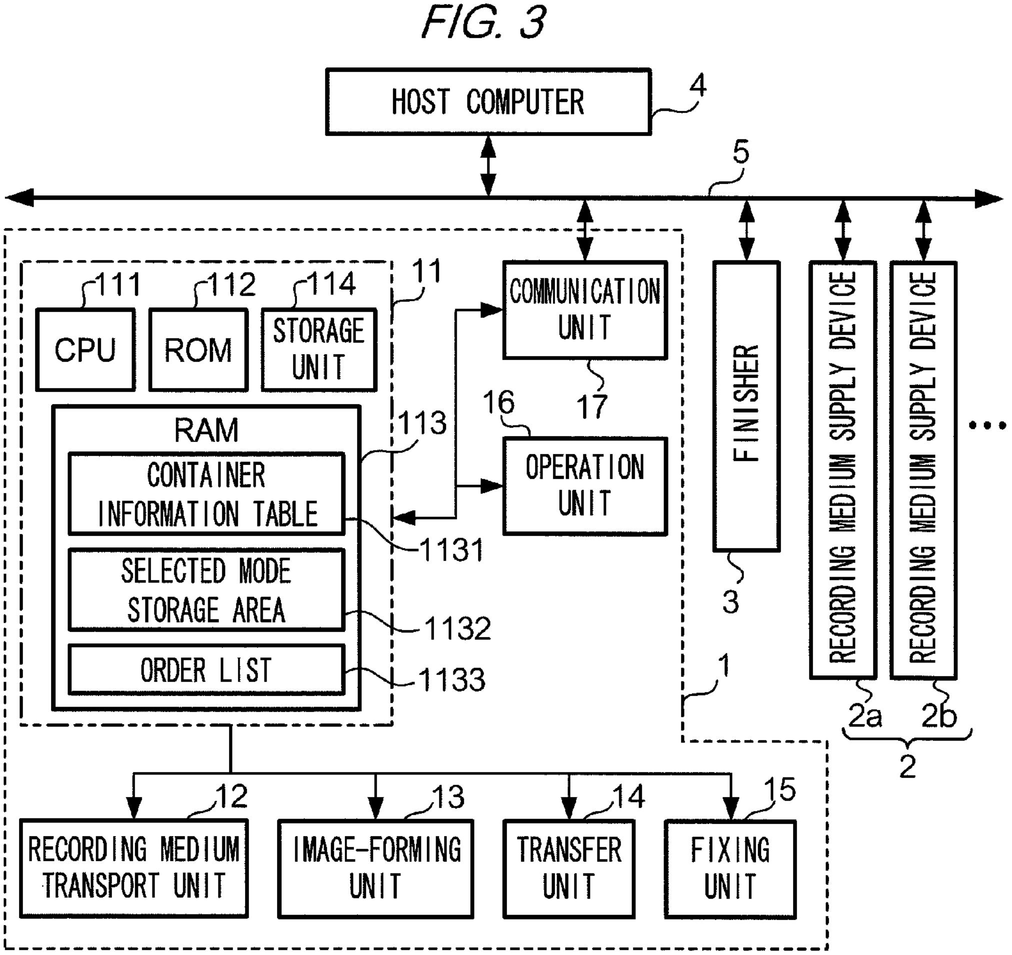
FIG. 3 is a block diagram showing a relation between devices of an image-forming system.
FIGS. 5A and 5B are diagrams showing an example of an order list stored in a RAM.

FIG. 2 is a schematic view of a structure of image-forming device 1. FIG. 3 is a block diagram showing a relation between devices of image-forming system 9. Image-forming device 1 includes recording medium transport unit 12, image-forming units 13Y, 13M, 13C, and 13K, transfer unit 14, fixing unit 15, operation unit 16, communication unit 17, and controller 11. The characters Y, M, C, and K of image-forming units 13Y, 13M, 13C, and 13K mean yellow, magenta, cyan, and black, respectively, and image-forming units 13Y, 13M, 13C, and 13K use a toner of a corresponding color. Image-forming units 13Y, 13M, 13C, and 13K will be hereinafter collectively referred to as "image-forming unit 13," except where it is necessary to specify otherwise. The components of image-forming device 1 are controlled by controller 11.

Controller 11 includes CPU (Central Processing Unit) 111, ROM (Read Only Memory) 112, RAM (Random Access Memory) 113, and storage unit 114 such as an EEPROM (Electrically Erasable Programmable Read Only Memory). CPU 111 reads a program stored in storage unit 114, in RAM 113, and executes the program to control image-forming device 1. CPU 111 functions as a determining unit that determines for plural of containers that supply recording media to an image-forming unit that forms an image on a recording medium whether recording media stored in the container are available for forming an image. CPU 111 also functions as a deciding unit that decides an order of containers, among containers whose recording media have been determined by a determining unit to be available for forming an image, on the basis of times at which the containers have been determined by the determining unit to be available for forming an image.

RAM 113 has selected mode storage area 1132 in which a selected method (hereinafter referred to as "mode") for determining an order of use of containers is stored. RAM 113 also stores container information table 1131 in which information on containers of recording medium supply device 2 is described, and order list 1133 showing an order of use of containers, used when a "variation mode" is selected. Details of container information table 1131, selected mode storage area 1132, and order list 1133 will be discussed later.

Image-forming unit 13 includes a photosensitive drum, a roller-charging device, an exposure device, a developing device, a first transfer roll, a drum cleaner, and a discharging device. The photosensitive drum is an image carrier with a charge generating layer and a charge transport layer, and is caused to rotate in the direction of the arrow in FIG. 2 by a driving unit (not shown). The roller-charging device charges a surface of the photosensitive drum. The exposure device includes a laser emission source and a polygon mirror (none of which is shown), and under control of controller 11, emits laser light to the photosensitive drum charged by the roller-charging device, on the basis of image data. The developing device houses binary developers including toner particles of a color of Y, M, C, or K, and magnetic carriers such as ferrite particles. If an end of a magnetic brush of the developing device is brought into contact with a surface of the photosensitive drum, toner becomes attached to a part of the surface exposed by the exposure device (namely, a drawing part of an electrostatic latent image), and as a result, an image is formed (developed) on the photosensitive drum.

The first transfer roll generates a predetermined difference in potential at a position where intermediate transfer belt 141 of transfer unit 14 faces the photosensitive drum of image-forming unit 13, whereby an image is transferred to intermediate transfer belt 141. The drum cleaner removes toners remaining on a surface of the photosensitive drum after an image is transferred. The discharging device discharges a surface of the photosensitive drum.

Recording medium transport unit 12 transports a recording medium such as a sheet provided from recording medium supply device 2 to transfer unit 14 via a recording medium transport path. Recording medium transport unit 12 also transports a recording medium on which an image has been formed by transfer unit 14 to fixing unit 15. Recording medium transport unit 12 functions as a supply unit that identifies a container in an order decided by CPU 111, and retrieves a recording medium from the container to supply the recording medium to an image-forming unit.

Transfer unit 14 includes intermediate transfer belt 141, second transfer roll 142, belt transport rolls 143, and backup roll 144, and transfers an image formed by image-forming unit 13 to a recording medium. Intermediate transfer belt 141 is a circular belt member, which is suspended and tensioned by belt transfer rolls 143 and backup roll 144. At least one of belt transport rolls 143 and backup roll 144 is provided with a driving unit (not shown), whereby intermediate transfer belt 141 is caused to move in the direction of the arrow in FIG. 2. Belt transport roll 143 or backup roll 144, not provided with a driving unit, is caused to rotate by movement of intermediate transfer belt 141. If intermediate transfer belt 141 is caused to rotate in the direction of the arrow in FIG. 2, an image transferred by transfer unit 14 is moved to a nip area formed by second transfer roll 142 and backup roll 144. Second transfer roll 142 transfers the image on intermediate transfer belt 141 to a recording medium transported by recording medium transport unit 12, using a difference in potential between second transfer roll 142 and intermediate transfer belt 141. Belt cleaner 149 removes toners remaining on a surface of intermediate transfer belt 141 that has not been transferred.

A recording medium to which an image has been transferred by transfer unit 14 is provided to fixing unit 15. Fixing unit 14 includes a heating roll and a support roll, and fixes an image transferred onto a recording medium. A recording medium on which an image has been fixed is provided to finisher 3. Namely, image-forming unit 13, transfer unit 14, and fixing unit 15 function as an image-forming unit that forms an image on a recording medium supplied from recording medium supply device 2.

Operation unit 16 includes a display having a function of displaying a user interface screen, and a function of receiving an input operation by a user to a user interface screen. The display may be a liquid crystal touch panel. Operation unit 16 also includes operation buttons for inputting various commands. Operation unit 16 receives an input operation by a user and provides a corresponding signal to CPU 111. Operation unit 16 functions as an instruction unit that provides an instruction to an image-forming unit to form an image. Communication unit 17 is a unit that communicates with network 5.

1-1-3. Configuration of Container Information Table

Figures 4, 6:
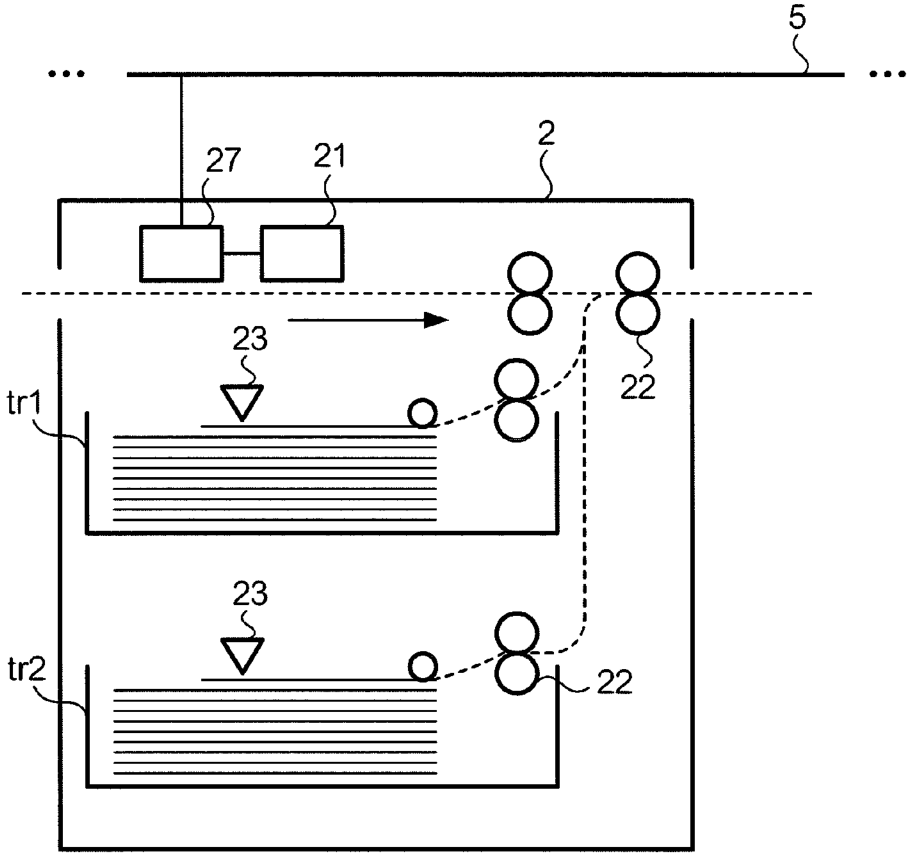
FIG. 4 is a diagram showing an example of a container information table stored in a RAM.
FIG. 6 is a schematic view of a structure of a recording medium supply device.

FIG. 4 is a diagram showing an example of container information table 1131 stored in RAM 113. In the table, a registry number is a serial number of a record registered in container information table 1131. Each registry number is different so that a registered record can be identified. An order of records to which a registry number is sequentially assigned may be arbitrarily determined. For example, a registry number may be automatically and sequentially assigned to a record in an order of connection by recording medium supply device 2 to image-forming device 1 via network 5. In the table, a container is a unit that stores recording media. In the table, identification data of all containers included in image-forming system 9 is registered as container identification data. Recording medium supply device identification data is identification data of a recording medium supply device including containers. A recording medium size is a size of a recording medium stored in a container. In the table, codes A4, B5, A3, and B4 are JIS codes representing a size of a sheet.

A recording medium supply direction is a direction of a recording medium to be supplied. Specifically, if a recording medium supply direction is "lateral," a longer direction of a recording medium corresponds to a supply direction, and if a recording medium supply direction is "longitudinal," a shorter direction of a recording medium corresponds to a supply direction. In the present exemplary embodiment, it is assumed that a user operates image-forming device 1 at a position perpendicular to a supply direction; accordingly, a supply direction corresponds to a lateral direction from the viewpoint of a user. In the table, availability is information indicating whether a container can be used. If a status "available" is registered, a container can be used, and if a status "not available" is registered, a container cannot be used. The table shows that containers corresponding to registry numbers 4 and 7 cannot be used.

CPU 111 receives information on containers from recording medium supply device 2 using communication unit 17. CPU 111 generates container information table 1131 on the basis of received information, and stores it in RAM 113.

1-1-4. Configurations of Selected Mode Storage Area and Order List

Selected mode storage area 1132 of RAM 113 stores data indicating one of a "fixed mode" and a "variation mode." Specifically, selected mode storage area 1132 may store one bit flag, one of which is a flag "0" that is interpreted as a "fixed mode," and the other of which is a flag "1" that is interpreted as a "variation mode."

A "fixed mode" is a mode in which containers are used in a predetermined fixed order. In the exemplary embodiment, an ascending order of registry numbers of container information table 1131 described above is used as a fixed order. A "variation mode" is a mode in which an order of use of containers is changed depending on a timing of a change in a status of a container or a timing of an operation by a user. If a "variation mode" is specified, controller 11 uses order list 1133 stored in RAM 113.

FIG. 5 is a diagram showing an example of order list 1133 stored in RAM 113. CPU 111 of controller 11 on receiving a print instruction from a user and obtaining print conditions, determines whether a mode registered in selected mode storage area 1132 is a "variation mode." If the determination is affirmative, CPU 111 identifies containers in container information table 1131, that have container information at least part of which meets the obtained print conditions. Subsequently, CPU 111 generates order list 1133 including the identified containers as elements. For example, if printing to a recording medium of A4 size is instructed, CPU 111 searches container information table 1131 in numerical order of registry numbers, for containers whose recording medium size is "A4" and which can be used. Taking container information table 1131 shown in FIG. 4 as an analogy, CPU 111 generates order list 1133 shown in FIG. 5A. In the following description, it is assumed that order list 1133 has been generated that includes container identification data tr1 to tr5 as elements.

CPU 111 is able to delete an element from order list 1133 or add an element to order list 1133. When deleting an element from order list 1133, CPU 111 removes the element from order list 1133, and assigns a number to elements having a "use order" larger than that of the removed element, the number being the original number minus one. Namely, CPU 111 removes an element, and closes the gap caused by the removal in a "use order." For example, if an element having a "use order" of "1" is deleted, an element originally having a "use order" of "2" will have a new "use order" of "1," and an element originally having a "use order" of "3" will have a new "use order" of "2." On the other hand, if an element having a "use order" of "3" is deleted, there will be no change in a "use order" of elements originally having "use order" of "1" or "2" and an element originally having a "use order" of "4" will have a new "use order" of "3."

When adding an element to order list 1133, CPU 111 assigns a number to the element, that is calculated by adding one to a maximum "use order" number described in order list 1133, and adds the element to the bottom of order list 1133. For example, if container identification data tr6 is added to order list 1133 including container identification data tr1 to tr5 shown in FIG. 5*b*, container identification data tr6 will have a "use order" of "6."

CPU 111 manipulates order list 1133 according to the following three rules.

(Rule 1) When use of a container is started, CPU 111 deletes container identification data of the container from order list 1133.

(Rule 2) If a container becomes not available, and container identification data of the container is included in order list 1133, CPU 111 deletes the container identification data from order list 1133.

(Rule 3) If a container becomes available, and container identification data of the container is not included in order list 1133, CPU 111 adds the container identification data to the bottom of order list 1133.

1-1-5. Configuration of Recording Medium Supply Device

Figure 7:
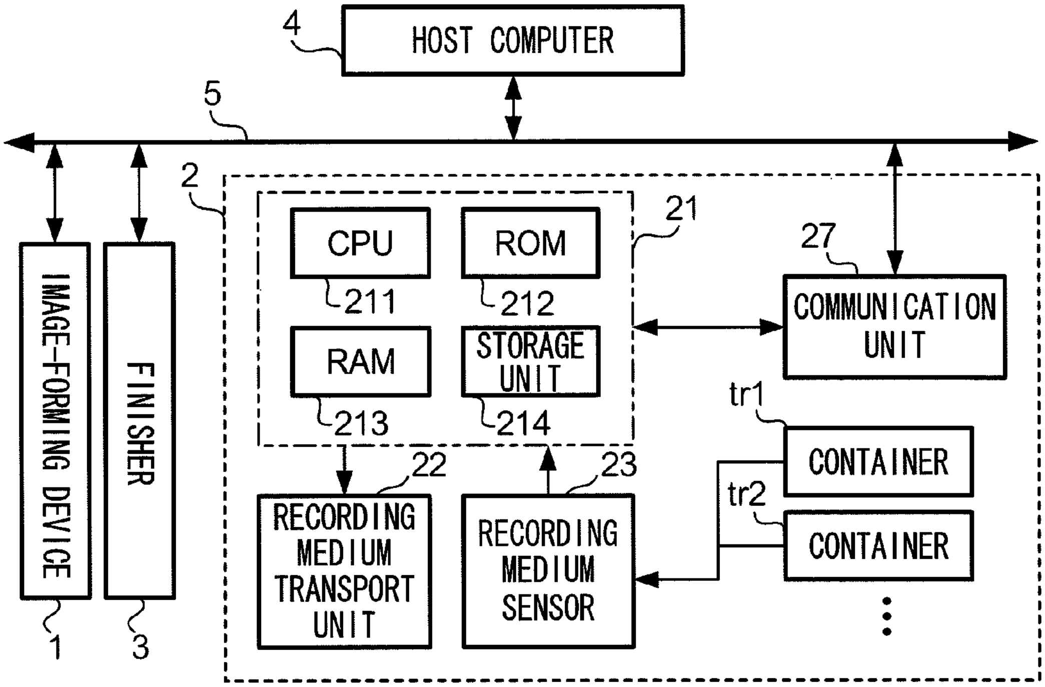
FIG. 7 is a block diagram showing a configuration of a recording medium supply device.

FIG. 6 is a schematic view of a structure of recording medium supply device 2. FIG. 7 is a block diagram showing a configuration of recording medium supply device 2. Controller 21 includes CPU 211, ROM 212, RAM 213, and storage unit 214. Configurations of CPU 211, ROM 212, RAM 213, and storage unit 214 are identical to those of CPU 111, ROM 112, RAM 113, and storage unit 114 described above, respectively, except for specifications and programs stored and executed therein. Accordingly, a description each of CPU 211, ROM 212, RAM 213, and storage unit 214 will be omitted. Similarly, a configuration of communication unit 27 is identical to that of communication unit 17; accordingly, a description of communication unit 27 will be omitted.

Recording medium supply device 2 includes containers tr1, tr2, . . . that store recording media such as sheets, and in response to a control signal sent from image-forming device 1 to CPU 211 via communication unit 27, selects containers. Recording medium transport unit 22 includes plural transport rolls, and retrieves recording media from a container one by one, and transports them to image-forming device 1, using the plural transport rolls. Recording medium sensor 23 includes a sensing mechanism that detects whether a recording medium is stored in each container, or senses a size, supply direction, or remaining amount of recording media stored in a container. The sensing mechanism may be a combination of a light source and an optical sensor. Recording medium sensor 23 generates a signal corresponding to a sensed condition, and sends the signal to CPU 211. On receipt of the signal, CPU 211 sends the signal to CPU 111 of image-forming device 1 via communication unit 27 and network 5.

1-2. Operation of First Exemplary Embodiment

Figure 8:
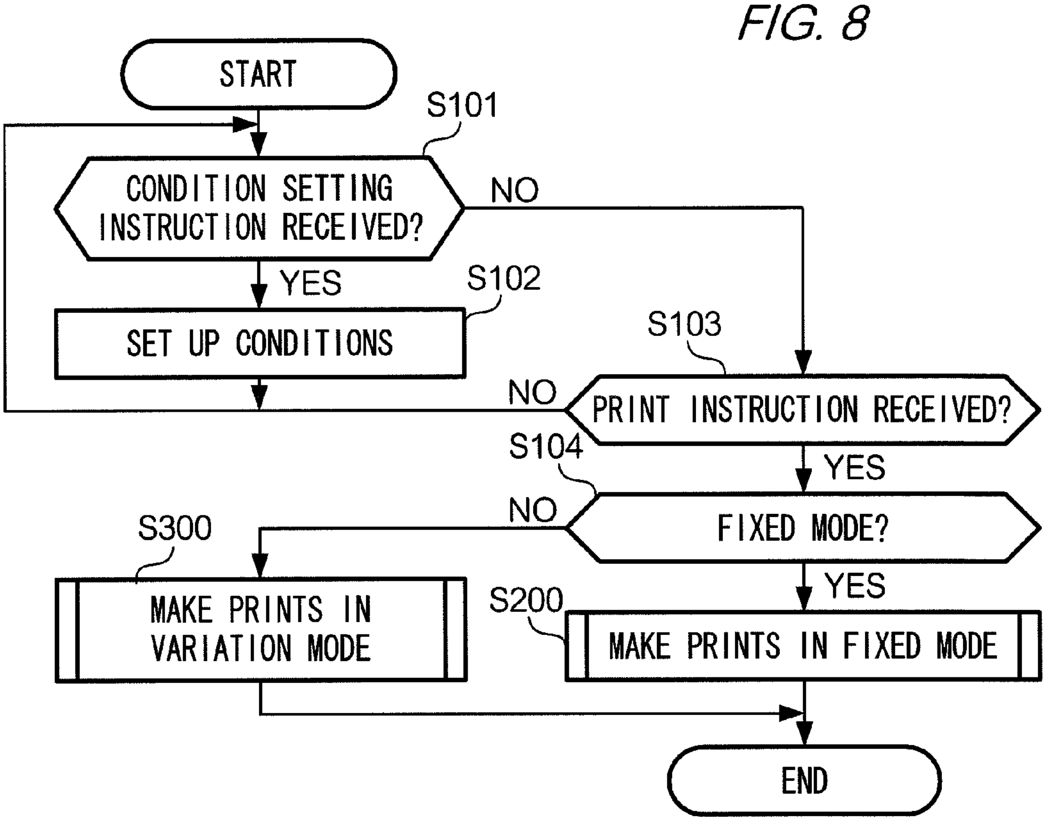
FIG. 8 is a flow diagram showing a flow of an operation of a controller of an image-forming device.
Figure 9:
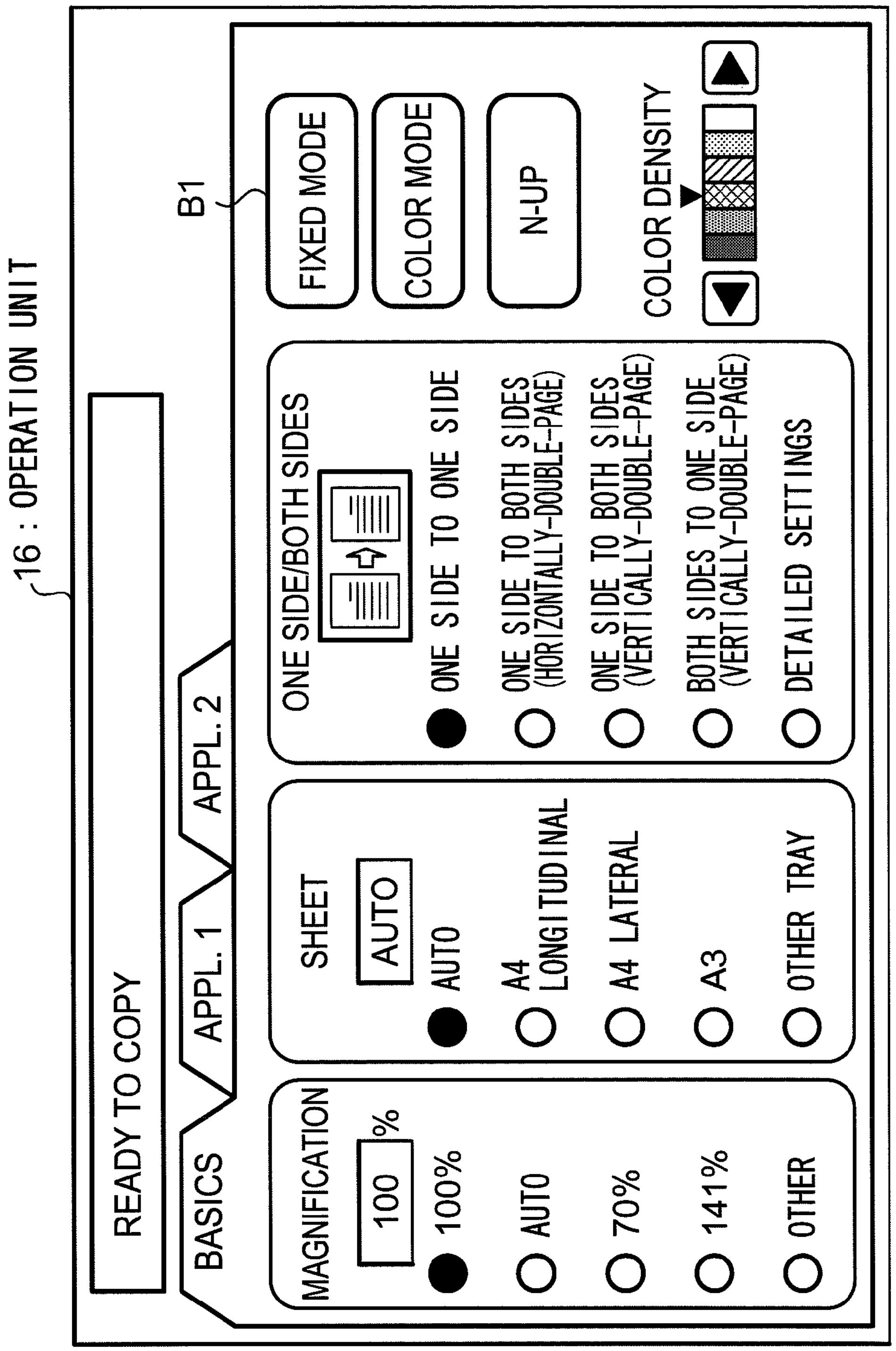
FIG. 9 is a diagram showing an example of an operation screen displayed on a display of an operation unit of an image-forming device.

An operation of image-forming system 9 will be described. FIG. 8 is a flow diagram showing a flow of an operation of controller 11 of image-forming device 1. FIG. 9 is a diagram showing an example of an operation screen displayed on a display of operation unit 16 of image-forming device 1. The operation screen shown in FIG. 9 is displayed on a display of operation unit 16 when a power button (not shown) is pressed by a user. Using the operation screen, a user sets up print conditions such as magnification, sheet type, or print side (one-sided or two-sided). In area B1 of the operation screen, a button for selecting a mode is displayed. In the initial condition, a character string "fixed mode" is displayed in area B1, and if a print instruction is provided in that condition, a use order of containers is determined in accordance with a fixed mode. If the button is pressed, the character string displayed in area B1 is changed to "variation mode," and if the button is further pressed, the character string is returned to "fixed mode." Namely, the button is a toggle button for switching between two modes: a "fixed mode" and a "variation mode." The button functions as a mode-specifying unit that specifies whether to use a mode in which containers are arranged in a predetermined order, as a mode for deciding an order of containers.

While the operation screen shown in FIG. 9 is displayed on the display of operation unit 16, CPU 111 of controller 11 determines whether an instruction to set up print conditions has been received from a user (step S101). If it is determined that an instruction to set up print conditions has been received from a user (step S101; YES), CPU 111 sets up print conditions by storing data corresponding to the setup instruction in RAM 113 (step S102), and returns to the operation of step S101. As a result, data on print conditions such as a size of a recording medium to be provided from a container is stored in RAM 113. If it is determined that an instruction to set up print conditions has not been received from a user (step S101; NO), CPU 111 determines whether a print instruction using an operation button of operation unit 16 has been received (step S103). If it is determined that a print instruction has not been received (step S103; NO), CPU 111 returns to the operation of step S101. On the other hand, if it is determined that a print instruction has been received (step S103; YES), CPU 111 determines whether a mode is a "fixed mode" (step S104). If it is determined that a mode is a "fixed mode" (step S104; YES), CPU 111 controls components of image-forming device 1 to carry out a print operation in a "fixed mode" (step S200). On the other hand, if it is determined that a mode is a "variation mode," not a "fixed mode" (step S104; NO), CPU 111 controls components of image-forming device 1 to carry out a print operation in a "variation mode" (step S300). Namely, CPU 111 functions as a deciding unit that if a mode is specified by a mode-specifying unit in which containers are arranged in a predetermined order, decides an order of containers so that the containers are arranged in the predetermined order, and if the mode is not specified by the mode-specifying unit, decides an order of the containers on the basis of times at which the containers have been determined to be available.

Figure 10:
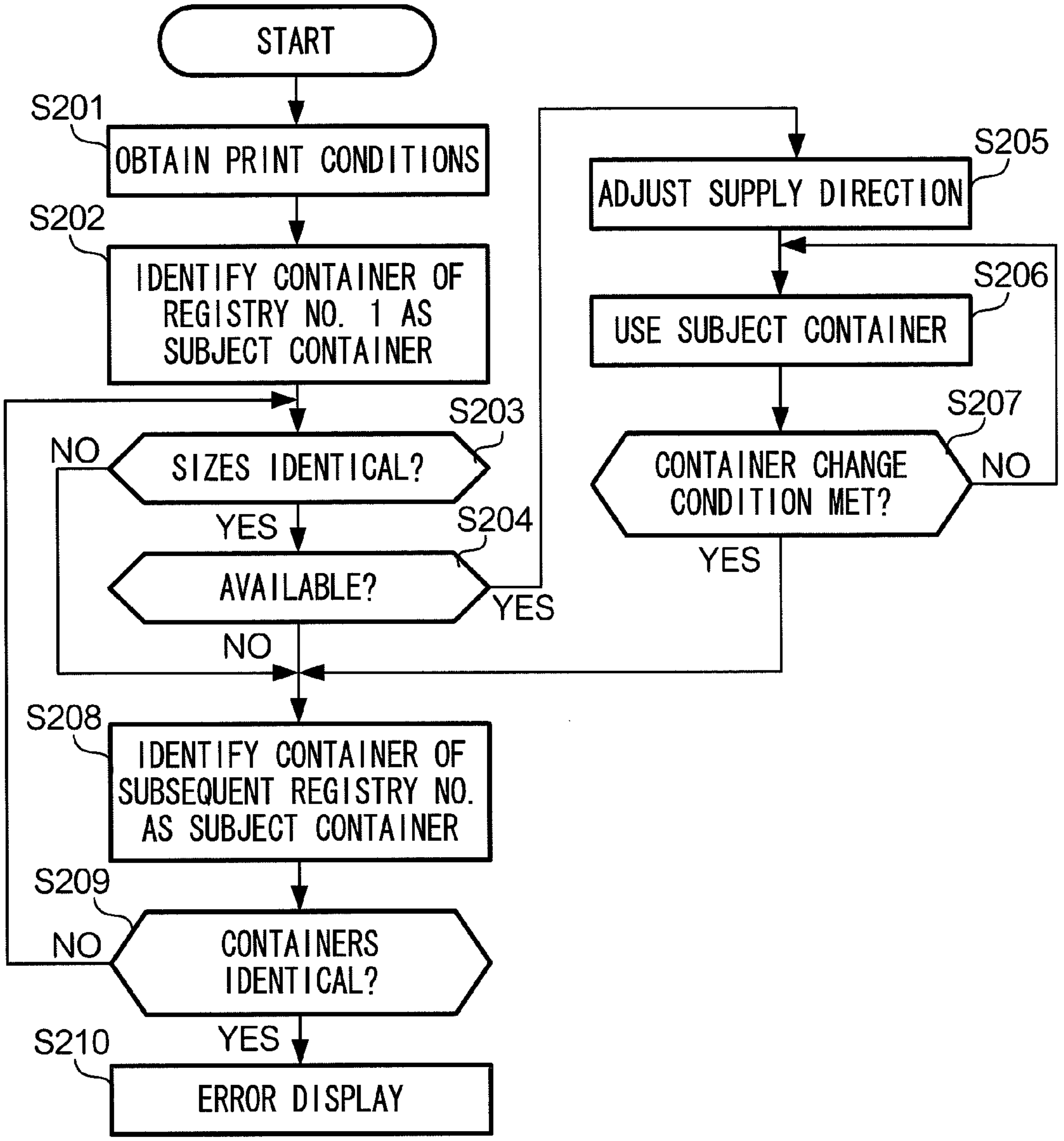
FIG. 10 is a flow diagram showing a flow of a print operation using a fixed mode.

FIG. 10 is a flow diagram showing a flow of a print operation using a "fixed mode" shown at step S200 of FIG. 8. In the flow of a print operation, CPU 111 initially obtains print conditions from RAM 113 (step S201). Subsequently, CPU 111 refers to container information table 1131 stored in RAM 113 to identify a container having registry number "1" in the table, as a subject container (step S202). Subsequently, CPU 111 compares a size of a recording medium identified based on the obtained print conditions and a size of a recording medium corresponding to the subject container to determine whether their sizes are identical (step S203). If it is determined that their sizes are identical (step S203; YES), CPU 111 determines whether the subject container is "available" (step S204). If it is determined that the subject container is "available" (step S204; YES), CPU 111 makes an adjustment to match a supply direction of recording media stored in the subject container with a supply direction of a recording medium identified based on the obtained print conditions (step S205). Specifically, if a supply direction of recording media stored in the subject container and a supply direction of a recording medium identified based on the obtained print conditions do not correspond with each other, CPU 111 provides an instruction to cause recording medium transport unit 12 to change a supply direction of a recording medium on a recording medium transport path, or converts image data to be provided to image-forming unit 13 so that it conforms to a supply direction of a recording medium described in container information table 1131 in association with the subject container. It is to be noted that the order of steps S203 and 204 may be reversed. In essence, CPU 111 determines whether a size of a corresponding recording medium meets print conditions, and a container is available.

Subsequently, CPU 111 uses the subject container (step S206). Specifically, CPU 111 sends a control signal to recording medium supply device 2 having the subject container via communication unit 17, to retrieve recording media from the subject container one recording medium at a time, and carries out a print operation. CPU 111 also stores identification data of the subject container in RAM 113 as identification data of a most-recently-used container. Subsequently, CPU 111 determines whether a container change condition, which is a condition for changing a container, has been met (step S207). The container change condition is, for example, a condition that the number of recording media remaining in the subject container is smaller than a threshold value, or a condition that a supply of recording media has run out. CPU 111 determines whether a container change condition has been met on the basis of a sensing signal that is generated by recording medium sensor 23 and sent to CPU 111 via network 5. If it is determined that a container change condition has not been met (step S207; NO), CPU 111 returns to the operation of step S206, and continues to use the subject container.

If it is determined that a size of a recording medium identified based on the obtained print conditions and a size of a recording medium corresponding to the subject container are not identical (step S203; NO), if it is determined that the subject container is "not available" (step S204; NO), or if it is determined that a container change condition has been met (step S207; YES), CPU 111 proceeds to an operation of step S208. At step S208, CPU 111 identifies a container having a subsequent registry number as a subject container (step S208). Specifically, if an old container is a container having registry number "1," CPU 111 identifies a container having registry number "2" as a subject container, and if an old container is a container having the largest registry number in container information table 1131, CPU 111 identifies a container having registry number "1" as a subject container. Subsequently, CPU 111 compares identification data of the new subject container and the identification data of a most-recently used container stored in RAM 113 at step S206 to determine whether the pieces of identification data are identical (step S209). If it is determined that the pieces of identification data are identical, CPU 111 determines that there is no alternative container, and displays an error screen (step S210). The error screen is, for example, a screen for prompting a user to replenish a container with recording media.

Figure 11:
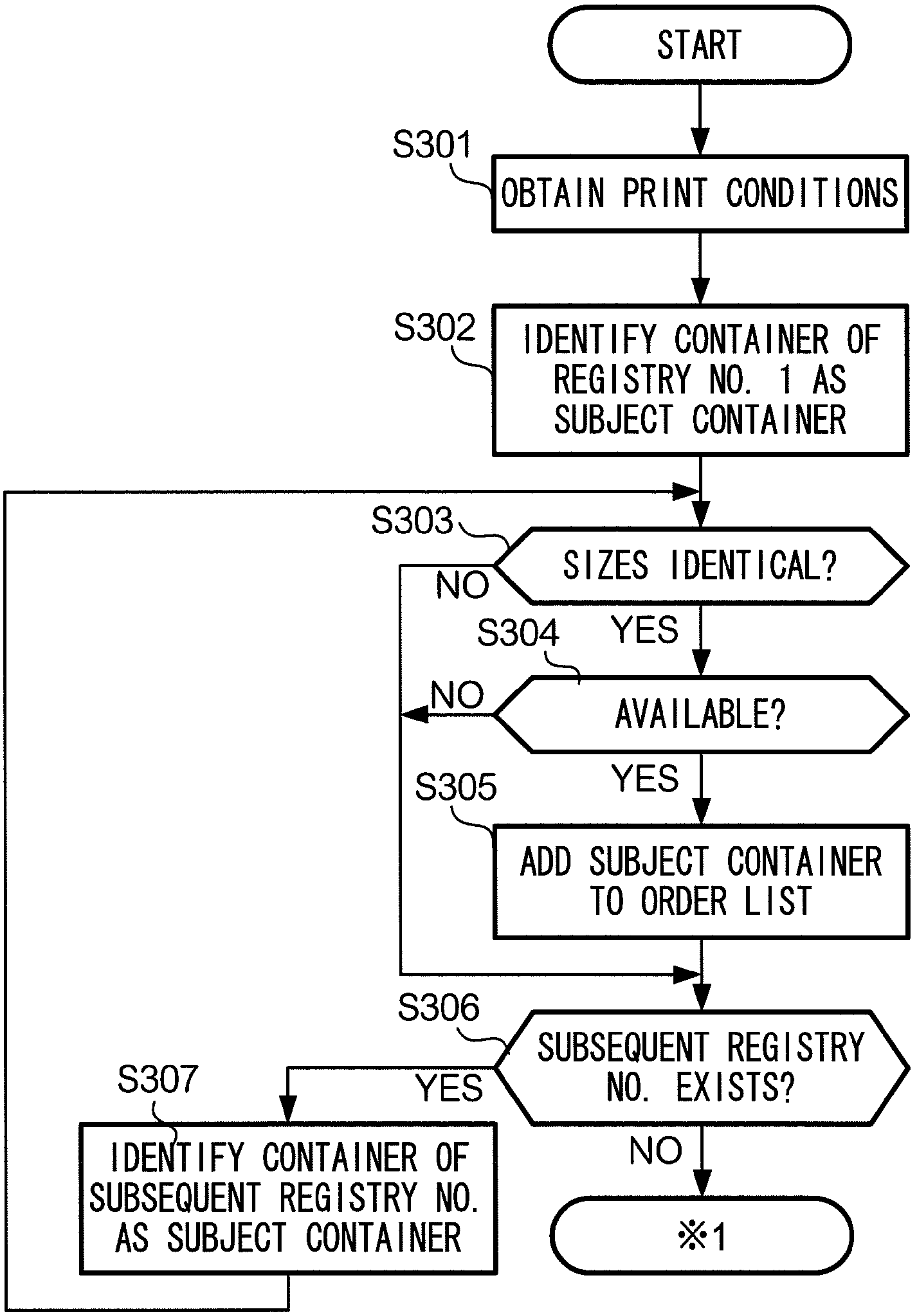
FIG. 11 is a flow diagram showing a flow of generating an order list in a print operation using a variation mode.

FIG. 11 is a flow diagram showing a flow of generating order list 1133 in a print operation using a "variation mode" shown at step S300 of FIG. 8. In the flow of a print operation, CPU 111 initially obtains print conditions from RAM 113 (step S301). Subsequently, CPU 111 refers to container information table 1131 stored in RAM 113 to identify a container having registry number "1" in the table, as a subject container (step S302).

Subsequently, CPU 111 compares a size of a recording medium identified based on the obtained print conditions and a size of a recording medium corresponding to the subject container to determine whether their sizes are identical (step S303). If it is determined that their sizes are identical (step S303; YES), CPU 111 determines whether the subject container is "available" (step S304). If it is determined that the subject container is "available" (step S304; YES), CPU 111 adds the subject container to order list 1133 (step S305), and proceeds to an operation of step S306. On the other hand, if it is determined that a size of a recording medium identified based on the obtained print conditions and a size of a recording medium corresponding to the subject container are not identical (step S303; NO), or if it is determined that the subject container is "not available" (step S304; NO), CPU 111 proceeds to an operation of step S306, without adding the subject container to order list 1133.

At step S306, CPU 111 determines whether a subsequent registry number exists in container information table 1131 (step S306). If it is determined that a subsequent registry number does not exist (step S306; NO), CPU 111 proceeds to an operation of step S308 (shown in FIG. 12). If it is determined that a subsequent registry number exists (step S306; YES), CPU 111 identifies a container having the subsequent registry number, as a subject container (step S307), and returns to the operation of step S303.

Figure 12:
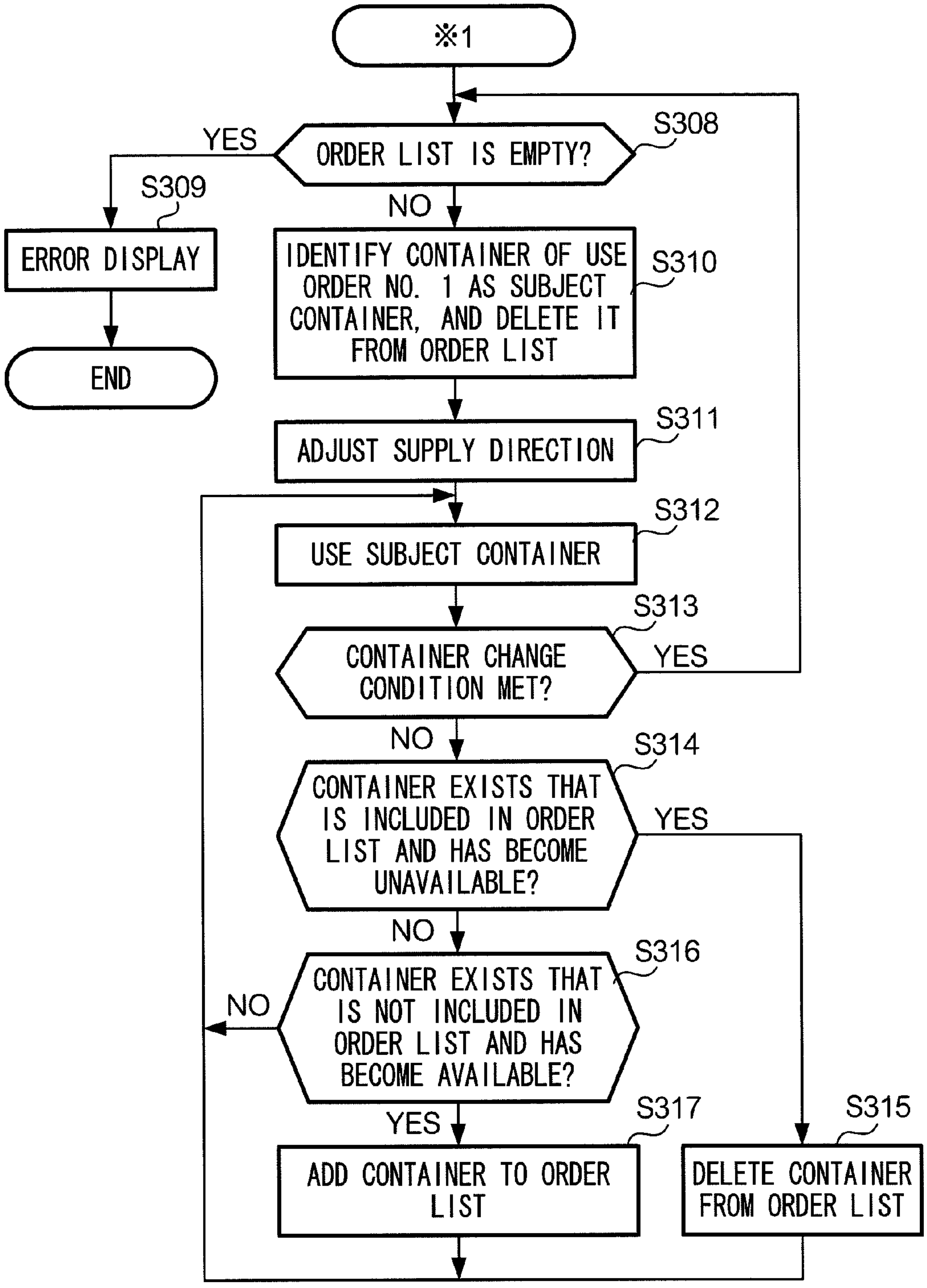
FIG. 12 is a flow diagram showing a flow of a print operation in which a container to be used is selected on the basis of an order list generated in a variation mode.

FIG. 12 is a flow diagram showing a flow of a print operation using a "variation mode" shown at step S300 of FIG. 8, in which a container to be used is selected on the basis of generated order list 1133. At step S308, CPU 111 determines whether order list 1133 is empty (step S308). If it is determined that order list 1133 is empty (step S308; YES), CPU 111 determines that there is no container available, and displays an error screen with an indication to that effect (step S309). CPU 111 thereafter ends the operation. If it is determined that order list 1133 is not empty (step S308; NO), CPU 111 identifies a container having use order "1" in order list 1133, as a subject container, and deletes an element associated with use order "1" from order list 1133 (step S310). Subsequently, CPU 111 adjusts a supply direction of a recording medium based on the obtained print conditions and container information of the subject container described in container information table 1131 (step S311), and carries out a print operation using the subject container (step S312). Thereafter, CPU 111 determines whether a container change condition has been met (step S313). If it is determined that a container change condition has been met (step S313; YES), CPU 111 returns to the operation of step S308.

On the other hand, if it is determined that a container change condition has not been met (step S131; NO), CPU 111 determines whether there is a container that has become unavailable in order list 1133 (step S314). If it is determined that there is a container that has become unavailable (step S314; YES), CPU 111 deletes the container from order list 1133 (step S315), and returns to the operation of step S312. If it is determined that there is no container that has become unavailable in order list 1133 (step S314; NO), CPU 111 determines whether there is a container that has become available, that is not included in order list 1133 (step S316). If it is determined that there is a container that has become available (step S316; YES), CPU 111 adds the container to the bottom of order list 1133 (step S317), and returns to the operation of step S312. If it is determined there is no container that has become available that is not included in order list 1133 (step S316; NO), CPU 111 directly returns to the operation of step S312. Namely, CPU 311 functions as a deciding unit that decides an order of containers, among containers that are available for forming an image, and thereafter if it is determined that media stored in a container included in the order have become available after replacement or replenishment of media, changes an order level of the container to a bottom of the order.

According to the configuration described above, image-forming system 9 sets a mode in accordance with an input instruction by a user, and determines a use order of containers to be used in a print operation, on the basis of the set mode. As a result, if a mode is a "fixed mode," image-forming system 9 selects a container to be used, in accordance with a fixed order; accordingly, a particular container (in the present exemplary embodiment, a container having registry number "1" included in container information table 1131) is preferentially used. On the other hand, if a mode is a "variation mode," image-forming system 9 selects a container to be used, in accordance with an order varying depending on statuses of containers; accordingly, a container may be selected in an order in which containers have become available, so a container that has first become available may be preferentially used.

Figure 13:
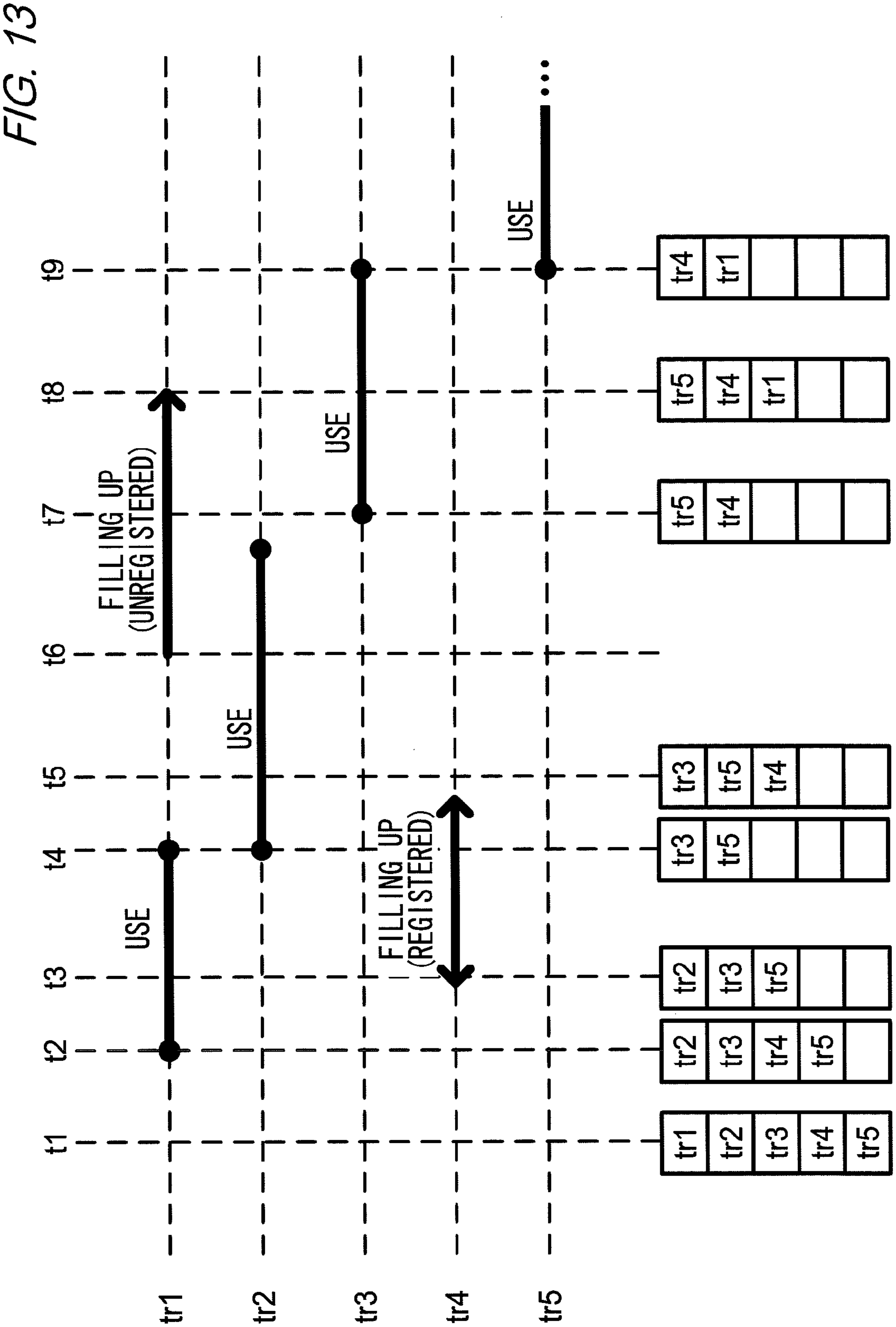
FIG. 13 is a timing diagram showing an example of statuses of use of containers and changes of an order list in a print operation using a variation mode.

Now, relative to the two flows described above, a concrete example of a print operation using a "variation mode" will be described. FIG. 13 is a timing diagram showing an example of statuses of use of containers and changes of order list 1133 in a print operation using a "variation mode." In order list 1133 shown in the lower part of the drawing, elements included in the list are arranged from top toward bottom in a use order. In the following description, in describing the elements in a string of characters, characters representing container identification data are arranged in an ascending order from use order "1." Also, a space between characters representing certain container identification data and characters representing subsequent container identification data is expressed by an arrow mark "=>."

For example, it is assumed that at time t1, which is a timing immediately after a user turns on image-forming device 1, recording medium supply device 2, finisher 3, and host computer 4, a display of operation unit 16 is displaying an operation screen shown in FIG. 9 under control of controller 11 of image-forming device 1. At time t1, order list 1133 has an order "tr1=>tr2=>tr3=>tr4=>tr5," as shown in FIG. 13. At time t2, if a print instruction is provided by a user, use of container tr1 is started, and an element associated with container tr1 is deleted from order list 1133. As a result, order list 1133 has an order "tr2=>tr3=>tr4=>tr5."

At time t3, it is assumed that a user pulls out container tr4 from recording medium supply device 2 to replenish the container with recording media. At the time, since order list 1133 includes "tr4," the operation is for replenishment of a registered container. In this case, at time t3, an element associated with container tr4 is deleted from order list 1133. Specifically, recording medium sensor 23 of recording medium supply device 2 detects a pullout of container tr4 from recording medium supply device 2 by a user, and sends a signal indicating that container tr4 is "not available" to image-forming device 1. On receipt of the signal, CPU 111 of image-forming device 1 reflects the fact indicated by the signal in container information table 1131 stored in RAM 113. CPU 111 also determines that container tr4 included in order list 1133 has become unavailable (step S314 of FIG. 12; YES), and deletes an element associated with container tr4 from order list 1133. As a result, order list 1133 has an order "tr2=>tr3=>tr5." Subsequently, at time t4, it is assumed that a container change condition for container tr1 is met, CPU 111 selects a subsequent subject container in accordance with order list 1133. At the time, since a container having use order "1" is container tr2, CPU 111 selects container tr2 as a new subject container, and deletes an element associated with container tr2 from order list 1133. As a result, order list 1133 has an order "tr3=>tr5."

At time t5, if the operation to replenish container tr4 with recording media started at time t3 is finished, recording medium sensor 23 of recording medium supply device 2 sends a signal to image-forming device 1, indicating that container tr4 is "available." On receipt of the signal, CPU 111 of image-forming device 1 reflects the fact indicated by the signal in container information table 1131 stored in RAM 113. CPU 111 also determines that container tr4, not included in order list 1133, has become available (step S316 of FIG. 12; YES), and adds an element associated with container tr4 to order list 1133. As a result, order list 1133 has an order "tr3=>tr5=>tr4."

At time t6, it is assumed that a user replenishes container tr1 with recording media. At time t6, since an element associated with container tr1 is not included in order list 1133, the operation is not for replenishment of a registered container. In this case, there will be no change in order list 1133. At time t7, if a container change condition is met, container tr3 is selected as a subsequent subject container in the manner described above. As a result, order list 1133 has an order "tr5=>tr4." Subsequently, at time t8, if the operation to replenish container tr1 with recording media is finished, container tr1 becomes available, and an element associated with container tr1 is added to order list 1133. As a result, order list 1133 has an order "tr5=>tr4=>tr1." Subsequently, at time t9, if a container change condition is met, since a container having use order "1" in order list 1133 is container tr5, container tr5 is selected as a subsequent subject container in the manner described above. Also, an element associated with container tr5 is deleted from order list 1133. As a result, order list 1133 has an order "tr4=>tr1."

As described in the foregoing, in the example shown in FIG. 13, an order of containers used from time t1 to time t9 is variable depending on operations of a user, not fixed as in an order "tr1=>tr2=>tr3=>tr4=>tr5."

According to image-forming system 9 described above, in a "variation mode," an order in which containers have been replenished with recording media by a user is reflected in an order in which containers are selected to carry out a print operation. Accordingly, times can be dispersed among containers, during which refilled media such as sheets remain unused. Namely, in image-forming system 9, an order of containers that supply recording media to an image-forming unit is determined so that frequencies in use of media stored in the containers are not biased. As a result, a situation is avoided in which recording media of one of containers are not used for a long period of time, as a result of which the recording media would deteriorate due to absorption of moisture.

2. Second Exemplary Embodiment

In the following description, differences between the present exemplary embodiment and the first exemplary embodiment will be mainly described.

In the exemplary embodiment, CPU 111 generates container information table 1131 and stores it in RAM 113, as in the case of the first exemplary embodiment. Registry numbers described in container information table 1131 are, in the present exemplary embodiment, used as numbers for determining an order of containers from which recording media are supplied to an image-forming unit. Accordingly, CPU 111 functions as a deciding unit that decides an order of plural containers that supply recording media to an image-forming unit that forms an image on a recording medium. In the first exemplary embodiment, CPU 111 identifies a container having registry number "1" as a subject container at step S202 of FIG. 10 and at step S302 of FIG. 11, after obtaining print conditions; whereas in the present exemplary embodiment, CPU 111 identifies a container that has been lastly used in an immediately preceding print operation, as a subject container. Specifically, CPU 111 stores data on a registry number (hereinafter, referred to as "last registry number") of a container that has been most recently used, in RAM 113, when terminating provision of recording media. Subsequently, if a new print instruction is received, CPU 111 obtains print conditions and the last registry number from RAM 113, and sets a container having the last registry number as a subject container. Namely, CPU 111 functions as a specifying unit that specifies one of plural containers.

Subsequently, at step S204, CPU 111 determines whether the container having the last registry number is "available." If it is determined that the container is "not available" (step S204; NO), CPU 111 identifies a container having a subsequent registry number as a subject container (step S208), and determines whether the container is "available." Namely, CPU 111 functions as a determining unit that determines for each of plural containers whether recording media stored in the container are available for forming an image, in an order decided by a deciding unit, in which a container specified by a specifying unit is set as a starting point.

On the other hand, if the container having the last registry number is "available" (step S204; YES), CPU 111 uses the container (step S206) until a container change condition is met (step S207; NO). Namely, CPU 111 functions as a supply unit that retrieves a recording medium from a container whose recording media have been determined by a determining unit to be available for forming an image, and supplies the recording medium to an image-forming unit. Subsequently, if a container change condition is met (step S207; YES), CPU 111 terminates providing recording media from the container, and identifies a container having a subsequent registry number as a subject container (step S208). Namely, CPU 111 functions as a specifying unit that, if a supply unit terminates providing recording media from a container whose recording media have been determined to be available, specifies a container subsequent to the used container in container information table 1131.

In the above description, the timing of terminating provision of recording media is when a container change condition is met. A condition may be that a supply of recording media has run out or that provision of a predetermined number of recording media is completed. CPU 111 also functions as a specifying unit that if a supply unit terminates providing recording media from a container having a last registry number in container information table 1131, specifies a container having a first registry number in the table.

According to the present exemplary embodiment, a registry number is not fixed to "1," at which a search for a container to be used in response to a print instruction starts. Accordingly, frequencies in use of recording media stored in containers may be unbiased. It is to be noted that at step S208 of FIG. 10 and step S307 of FIG. 11, if a registry number of a subject container is the largest number in container information table 1131, a subsequent registry number is "1." Also, when image-forming device 1 is turned off, a last registry number stored in RAM 113 may be stored in storage unit 114. If such an operation is conducted, CPU 111 may read out the last registry number from storage unit 114, and store the number in RAM 113 when image-forming device 1 is turned on and supply of power thereto is started. Namely, an operation for searching for a container may be controlled in image-forming device 1 immediately after its power is turned on, on the basis of a status of image-forming device 1 before its power is turned off. Also, a container that should be set as a subject container by CPU 111 after obtaining print conditions may be selected by a user from one of a container having registry number "1" and a container having a last registry number.

3. Third Exemplary Embodiment

In the following description, differences between the present exemplary embodiment and the first exemplary embodiment will be mainly described.

In the first exemplary embodiment, CPU 111 deletes an element of use order "1" from order list 1133 at step S310 of FIG. 12. In contrast, in the present exemplary embodiment, CPU 111 deletes an element of use order "1" from order list 1133, and also adds the deleted element to the bottom of order list 1133. In addition, CPU 111 does not carry out the operations of steps S314 to S317 of FIG. 12. CPU 111, if it is determined that a container change condition has not been met at step S313 (step S313; NO), returns to the operation of step S312.

Figure 14:
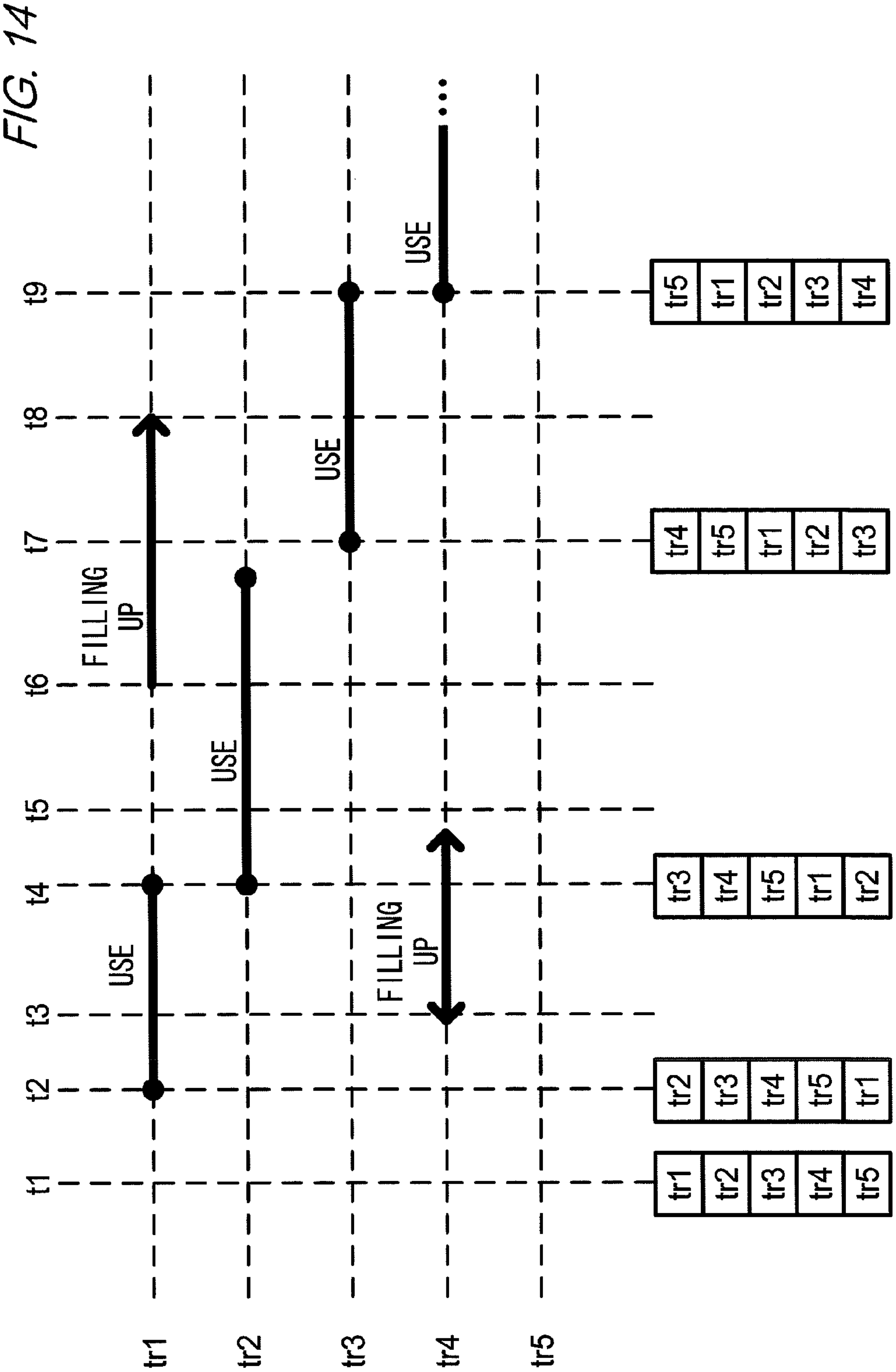
FIG. 14 is a timing diagram showing an example of statuses of use of containers and changes of an order list according to a modification.

FIG. 14 is a timing diagram showing an example of statuses of use of containers and changes of order list 1133 according to the present exemplary embodiment. At time t2 of the drawing, use of container tr1 is started. At the time, CPU 111 deletes an element associated with container tr1 from order list 1133, and adds the deleted element to the bottom of order list 1133. As a result, order list 1133 has an order "tr2=>tr3=>tr4=>tr5=>tr1." Subsequently, at time t3, container tr4 becomes unavailable since the container is replenished. However, order list 1133 is not affected by the event since the operations of steps S314 to S317 of FIG. 12 are not carried out. Similarly, at time t5, container tr4 becomes available since an operation to replenish container tr4 is finished; however, order list 1133 is not affected by the event. As a result, at time t9, container tr4, not container tr5, is selected as a subject container for use.

In the present exemplary embodiment, an order of elements in order list 1133 is maintained. Accordingly, a situation is avoided in which an unexpected container is selected as a subject container. This is because order list 1133 initially reflects an order of registry numbers of container information table 1131, and a subject container is selected in line with user's expectation that a subject container is selected in the order indicated by order list 1133. It is to be noted that if a container having use order "1" of order list 1133 is not available, and a container change condition is met, it may be determined that another container change condition is met since a subject container is not available. In this case, an unavailable container is skipped, without being used for providing recording media. As a result, an original order of order list 1133 is maintained.

Also, when image-forming device 1 is turned off, the above-mentioned last registry number stored in RAM 113 may be stored in storage unit 114. If such an operation is conducted, CPU 111 may read out the last registry number from storage unit 114, and store the number in RAM 113 when image-forming device 1 is turned on and supply of power thereto is started. Namely, an operation for searching for a container may be controlled in image-forming device 1 immediately after its power is turned on, on the basis of a status of image-forming device 1 before its power is turned off.

4. Modifications

The exemplary embodiments described above may be modified as described below. The following modifications may be combined with each other.

(1) In the above exemplary embodiments, it is stated that a container change condition may be that a number of recording media remaining in a subject container is lower than a threshold value, or that a supply of recording media has run out. However, a container change condition may further be that a recording medium cannot be supplied from a subject container owing to some type of trouble, that a halt instruction has been received from a user, or that a container has been pulled out by a user. A container change condition may be selected by a user.

(2) In the above exemplary embodiments, where a user is able to select either a "fixed mode" or a "variation mode" on an operation screen, the selection may be omitted. Specifically, a button for selecting a mode may be omitted on an operation screen. If such a configuration is employed, a user makes a setting of print conditions in image-forming device 1 or provides a print instruction to image-forming device 1, without selecting a mode, and image-forming device 1 carries out a print operation in only a "variation mode."

(3) In the above exemplary embodiments, where elements of order list 1133 generated by CPU 111 in a "variation mode" are container identification data, CPU 111 may generate order list 1133 including sets of container identification data and a time at which a container indicated by the container identification data has become available, as elements. If such a configuration is employed, CPU 111 may obtain time data with reference to a timer provided in controller 11, indicating a time at which a container has become available. In a case where CPU 111 carries out a parallel processing, it may be possible that an order in which elements are added to order list 1133 and an order in which containers have become available are different from each other. In this case, a "user order" of order list 1133 may be accorded with an order in which containers have become available, by rearranging an order of container identification data on the basis of time data stored in association with the container identification data.

In order list 1133, other information may be included in association with container identification data. For example, points accumulated according to a predetermined condition may be included. Specifically, points may be accumulated according to a condition such as a maximum number of recording media that can be stored in a container, a current number of recording media stored in a container, a time at which a container has become available, a number of errors of a container, a model number of a container, or a manufacturing date. An order of container identification data may be rearranged on the basis of points stored in association with the container identification data. According to the configuration, use of a container whose maximum number of recording media is large, a container whose number of errors is small, or a container whose manufacturing date is new is prioritized.

(4) In the above exemplary embodiments, where all available containers are registered in order list 1133 as elements in a "variation mode," a particular container may be excluded in accordance with specification by a user or initial conditions. For example, it may be that data on a container specified by a user on an operation screen is stored in storage unit 114, and the container is prevented from being added to order list 1133 even if the container is determined to be available. Namely, storage unit 114 functions as a container information storage unit that stores identification data of containers specified by a user among plural containers. Also, CPU 111 functions as a deciding unit that decides an order of containers that supply recording media to an image-forming unit, which are containers other than containers whose identification data are stored in a container information storage unit.

(5) In the above exemplary embodiments, if an operation to replenish a container with recording media is finished, recording medium sensor 23 of recording medium supply device 2 sends a signal indicating that the container is available, to image-forming device 1. In the exemplary embodiments, recording medium sensor 23 may send the signal to image-forming device 1, when controller 21 determines that a time at which an operation to replenish a container with recording media has been finished, to which a predetermined preparation time or a pre-calculated preparation time has been added, comes earlier than an expected time at which CPU 111 of image-forming device 1 determines that a container change condition is met. Namely, recording medium sensor 23 may send the signal to image-forming device 1 after determining that a container being used will not be changed until preparation of a container in which recording media have been refilled is completed. This is because, even if an operation to replenish a container with recording media is finished, the container is not actually available until a lift-up of a refilled recording medium is completed (specifically, a refilled recording medium is moved to a position at which recording medium transport unit 22 is able to retrieve recording media). In view of this, controller 21 may obtain a preparation time it takes to complete a lift-up by reading out a predetermined value from storage unit 214, or calculating a value using a predetermined mathematical formula on the basis of a number of refilled recording media measured by recording medium sensor 23. In addition, controller 21 may obtain data from image-forming device 1 via communication unit 27, indicating a predicted time at which a container change condition (for example, exhaustion of a supply of recording media in a container being used) will be met, and determine whether a time at which an operation to replenish a container with recording media has been finished, to which a preparation time has been added, comes earlier than the predicted time. If the determination is affirmative, controller 21 may send a signal indicating that the container has become available, to image-forming device 1. On receipt of the signal, CPU 111 determines whether recording media stored in containers are available for forming an image, at the same time as deciding an order of the containers. Namely, CPU 111 functions as a determining unit, when a decision of an order of containers is made, determines for one of plural containers whether recording media stored in the container are available for forming an image, in consideration of a preparation time that it takes to complete preparation for making the container available for forming an image after the media is replenished.

(6) In the exemplary embodiments, where a sheet is mentioned as an example of a recording medium, the sheet may be a pre-cut sheet having a predetermined size, or a rolled sheet. If a rolled sheet is used, the width of the roll may be described in container information table 1131 as a recording medium size. The sheet may be paper or plastic.

(7) In the above exemplary embodiments, where toners of Y, M, C, and K are used, transparent toner or foamed toner may be used. Also, image-forming device 1 may be, instead of a color-image-forming device, a black-and-white-image-forming device.

(8) In the above exemplary embodiments, an order in which containers are registered in container information table 1131 is automatically determined according to an order in which recording medium supply devices 2 are connected to image-forming device 1 via network 5. In the exemplary embodiments, registry numbers of container information table 1131 may be set by a user using operation unit 16. CPU 111, in response to an input operation by a user, may change registry numbers of records of container information table 1131. Also, CPU 111 may, when image-forming device 1 is turned off, store container information table 1131 in storage unit 114, and when image-forming device 1 is turned on, read out the container information table from storage unit 114.

(9) Programs executed by CPU 111 of image-forming device 1 may be stored in a computer readable medium for distribution, such as a magnetic recording medium (e.g., a magnetic tape or a magnetic disk), an optical recording (e.g., an optical disk), a magneto-optical recording medium, or a semiconductor memory. Alternatively, the programs may be distributed via a network such as the Internet. In the above exemplary embodiments, CPU 111 may be another device such as a dedicated processor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A supply control device comprising:

an image-forming unit that forms an image on a recording medium;

a deciding unit that decides an order of a plurality of containers that supply recording media to the image-forming unit;

a determining unit that determines for each of the plurality of containers whether each of the plurality of containers include recording media available for forming an image, in the order decided by the deciding unit;

a supply unit that retrieves recording media from a current container among the plurality of containers determined by the determining unit to include recording media available for forming the image, supplies the recording media from the current container to the image-forming unit, determines a container change condition that indicates the current container does not include recording media available for forming the image, terminates providing the recording media from the current container to the image-forming unit, and supplies the recording media to the image-forming unit from a subsequent container among the plurality of containers determined by the determining unit to include recording media available for forming the image, the subsequent container being subsequent in the order decided by the deciding unit to the current container in the order decided by the deciding unit; and a mode-specifying unit that specifies whether to use a mode in which containers are arranged in a predetermined order, as a mode for deciding an order of containers, or to use a mode in which containers are selected on the basis of times at which the containers have been determined to be available for forming an image, wherein if the mode is specified by the mode-specifying unit to use the mode in which containers are arranged in the predetermined order, the deciding unit decides an order of containers so that the containers are arranged in the predetermined order, and if the mode is specified by the mode-specifying unit to use the mode in which containers are selected on the basis of times at which the containers have been determined to be available for forming an image, the deciding unit decides an order of containers on the basis of times at which the containers have been determined to be available for forming an image.

2. The supply control device according to claim 1, wherein the current container is a last container in the order and the subsequent container is a first container in the order.

3. The supply control device according to claim 1, further comprising a container information storage unit that stores identification data of containers specified by a user among the plurality of containers, wherein the deciding unit decides an order of containers that are containers other than the containers whose identification data are stored in the container information storage unit.

4. An image-forming device comprising:

the supply control device according to claim 1; and an image-forming unit that forms an image on a recording medium supplied from the supply control device.

5. A supply control method comprising:

deciding, from among a first order in which containers are arranged in a predetermined order and a second order in which containers are selected on the basis of times at which the containers have been determined to be available for forming an image, an order of a plurality of containers that supply recording media to an image-forming unit that forms an image on a recording medium;

determining for each of the plurality of containers whether each of the plurality of containers include recording media available for forming an image, in the first order in which containers are arranged in the predetermined order if the first order is the decided order and in the second order in which containers are selected on the basis of times at which the containers have been determined to be available for forming an image if the second order is the decided order;

retrieving recording media from a current container among the plurality of containers including media available for forming the image;

supplying the recording media from the current container to the image-forming unit;

determining a container change condition that indicates the current container does not include recording media available for forming the image;

terminating providing the recording media from the current container to the image-forming unit; and supplying the recording media to the image-forming unit from a subsequent container among the plurality of containers determined to include recording media available for forming the image in the predetermined order if the first order is the decided order and the order in which containers are selected on the basis of times at which the containers have been determined to be available for forming an image if the second order is the decided order, the subsequent container being subsequent in the order to the current container in the order.

6. A non-transitory computer readable medium storing a program causing a computer to execute a process for supply control, the process comprising:

deciding, from among a first order in which containers are arranged in a predetermined order and a second order in which containers are selected on the basis of times at which the containers have been determined to be available for forming an image, an order of a plurality of containers that supply recording media to an image-forming unit that forms an image on a recording medium;

determining for each of the plurality of containers whether each of the plurality of containers include recording media available for forming an image, in the first order in which containers are arranged in the predetermined order if the first order is the decided order and in the second order in which containers are selected on the basis of times at which the containers have been determined to be available for forming an image if the second order is the decided order;

retrieving recording media from a current container among the plurality of containers including media available for forming the image;

supplying the recording media from the current container to the image-forming unit;

determining a container change condition that indicates the current container does not include recording media available for forming the image;

terminating providing the recording media from the current container to the image-forming unit; and supplying the recording media to the image-forming unit from a subsequent container among the plurality of containers determined to include recording media available for forming the image in the predetermined order if the first order is the decided order and the order in which containers are selected on the basis of times at which the containers have been determined to be available for forming an image if the second order is the decided order, the subsequent container being subsequent in the order to the current container in the order.

7. The supply control device according to claim 1, wherein the determining unit, when the deciding unit makes the decision of an order of containers, determines for one of the plurality of containers whether recording media stored in the container are available for forming an image, in consideration of a preparation time that it takes to complete preparation for making the container available for forming an image after the media are replenished.

* * * * *